Dec. 31, 1929.                    W. VEIT                    1,741,488
METHOD OF MAKING LINOLEUM AND PRODUCT THEREOF
Filed Feb. 9, 1929
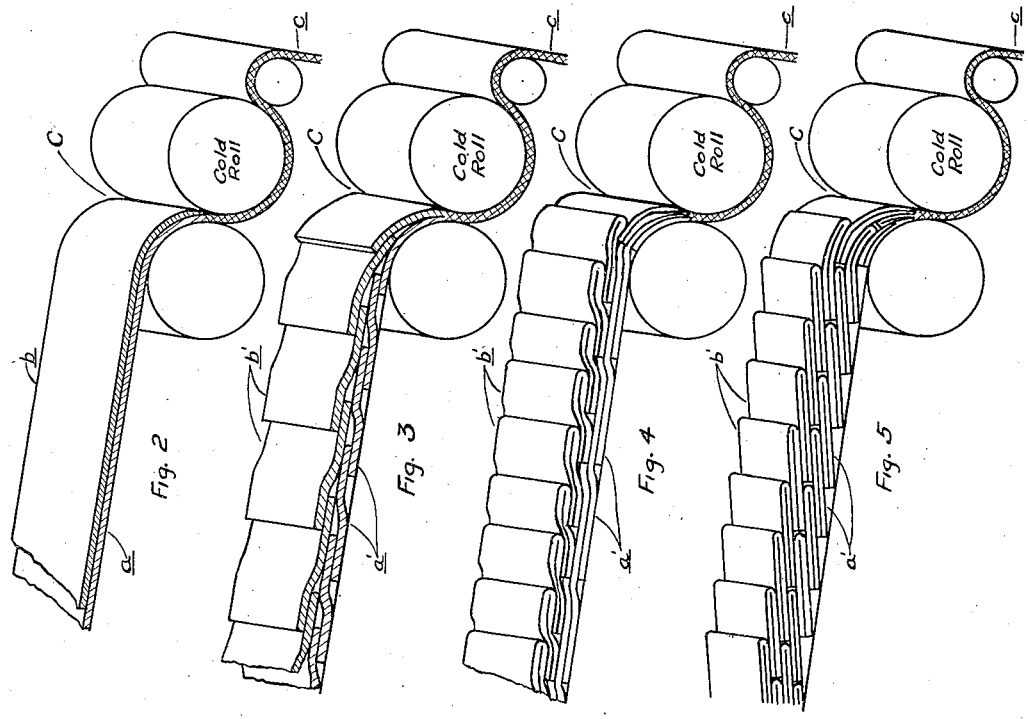
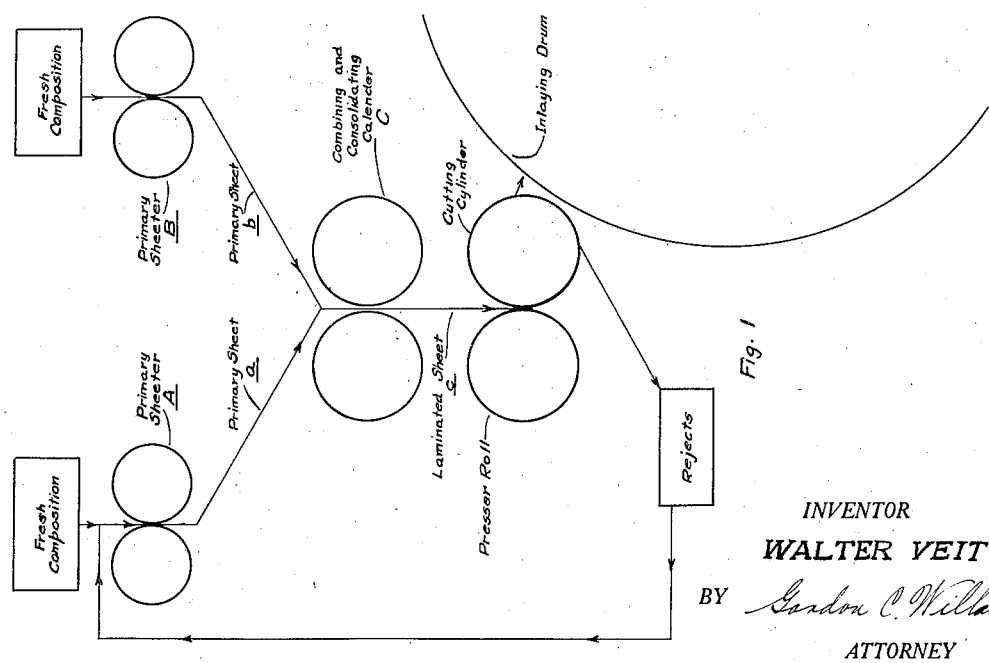
INVENTOR
WALTER VEIT
BY
ATTORNEY Patented Dec. 31, 1929

1,741,488

UNITED STATES PATENT OFFICE

WALTER VEIT, OF NEW YORK, N. Y., ASSIGNOR TO CONGOLEUM-NAIRN INCORPORATED, A CORPORATION OF NEW YORK

METHOD OF MAKING LINOLEUM AND PRODUCT THEREOF

Application filed February 9, 1929. Serial No. 338,706.

This invention relates to the manufacture of inlaid linoleum or the like, and more particularly to the method of manufacturing inlaid linoleum by means of automatic inlaying machinery, in which plastic materal of different colors, in the form of sheets, is taken from continuously-rotating calender rolls to continuously-rotating cutting cylinders, the knives on the latter cutting from the traveling material pieces of the required shape and size, these pieces being continuously assembled upon a travelling canvas or other suitable backing and thereafter consolidated by pressure and heat into a homogeneous floor covering displaying a pattern made up of the divers colors delivered by the respective calender rolls.

In such continuous operation, only one finished floor covering is continuously produced, whatever be the number of colored sheets from which it is assembled, and it is necessary to reject a total quantity of material from the sheets equal in volume to one sheet less than the number of sheets being used to produce the required pattern. The sheet material so rejected from one cutting cylinder, when of a single color, is, according to the present practice, returned to the mixing system where it is incorporated with fresh or virgin color composition, reformed into a sheet, and again fed to the same cutting cylinder. This method of operation is, in general, satisfactory when each sheet is monocolored, but it is wholly unsatisfactory in the production of patterns consisting of pattern elements of variegated color within the content of the same element, because the grained or marble appearance of the sheet as originally produced from fresh color and fed to the cutting cylinders, cannot be maintained or reproduced when the variegated reject material therefrom is returned and incorporated with fresh composition and again fed to the calender rolls and made into sheets for the cutting cylinder.

The principal object of my invention is to provide a novel process whereby patterns having a marbled or other variegated type of decoration may be produced continuously, and whereby the variegated reject composition from the cutting cylinders may be employed directly and continuously in the same pattern, without limiting or modifying the desired type of decoration. A further object is the production of a novel product as hereinafter more fully described.

Broadly, my invention contemplates forming directly from the tesseræ or blocks cut and rejected from a previously-formed sheet by one cutting cylinder, a primary sheet of re-used linoleum composition, forming a second primary sheet composed substantially entirely of fresh or virgin composition, combining and consolidating the two primary sheets in superimposed relation into a unitary laminated sheet of the desired characteristics and decoration, such unitary sheet having a stratum composed chiefly of reject or re-used composition and a stratum composed substantially entirely of virgin composition, the exposed or wearing surface of such unitary sheet being provided by the stratum of fresh composition, cutting tesseræ or blocks from said laminated sheet, utilizing certain of said tesseræ, rejecting others of said tesseræ, and employing in a continuous cycle the rejected tesseræ for the formation of additional portions of the primary sheet first-mentioned.

In the accompanying drawings:

Figure 1 is a diagrammatic representation showing the flow of materials according to my invention.

Figures 2, 3, 4, and 5 are detailed views showing various methods of manipulating the primary sheets prior to combining and consolidating the same into a single unitary sheet.

Linoleum or other plastic composition may be formed in numerous ways well known in the art into sheets having a variegated decoration. For the purpose of illustrating my invention, however, I will refer more particularly to the manner of manufacturing continuous variegated sheets of linoleum composition according to the method described in the application for patent of M. S. McConoughey, Serial No. 200,614, filed June 22, 1927, although it is to be understood that my invention is not thus limited.

According to the method referred to, individual primary sheets are formed from lumps of differently-colored linoleum composition. The primary sheets are then positioned in cross-rolling, overlapping relation and consolidated by rolling to form a continuous sheet having a non-directional, variegated decoration simulating marble. In employing variegated sheets of this type or other types in the well-known automatic inlaying machinery, the tesseræ or blocks which are cut from the continuous sheets are rejected, cannot readily and consistently be re-used in the manufacture of additional lengths of the same sheet from which they are cut according to any practice heretofore known. Usually, such rejects are stored and, from time to time, used for the manufacture of mono-colored linoleum composition by adding thereto considerable quantities of expensive pigments.

Referring now to Figure 1, my invention provides, for the first time, a method whereby substantially all or any desired portion of the variegated tesseræ or blocks of composition rejected at the cutting cylinders may be re-used in a continuous cycle. According to my invention, the rejects, as discarded at the cutting cylinders, are returned direct to a pair of rolls indicated as primary sheeter "A." To the rejects may be added, if desired, a small controlled amount of fresh linoleum composition. It is to be observed, however, that while the fresh composition and rejects may be tumbled together, there is no intergrinding of the two, nor a mixing of any sort which would tend to destroy the decoration of the individual rejects or to homogenize the colors thereof. At the primary sheeter "A," the rejects, or the rejects and fresh composition, are formed into a primary sheet $a$. Simultaneously, fresh or virgin composition, preferably in the form of lumps of different colors, if it is desired to produce an ultimate sheet having a marble type decoration, is fed to a second pair of rolls indicated as primary sheeter "B," where it is formed into a second primary sheet $b$.

The primary sheets $a$, $b$ thus formed are then, according to my invention, superimposed, and combined and consolidated into a single unitary sheet. This operation is preferably carried out by means of a third pair of rolls indicated as "C." Prior to the combining operation, the primary sheets $a$ and $b$ may be manipulated in a variety of ways, according to the particular type of decoration which it is desired to obtain in the ultimate sheet. As shown in Figure 2, the continuous sheets $a$ and $b$ from the primary sheeters "A" and "B" respectively, may be superimposed and passed together through the pair of rolls of calender C, where they are combined and consolidated to form a single unitary sheet of laminated structure. According to the practice described in the application of M. S. McConoughey above referred to, however, the continuous primary sheets $a$ and $b$ are severed into individual sheets $a'$ and $b'$ of a length substantially equal to the width of the ultimate laminated sheet. The individual sheets $a'$ are then positioned in transverse or cross-rolling, overlapping relation (see Figures 3, 4, and 5). The individual sheets $b'$ are superimposed thereupon in transverse or cross-rolling, overlapping relation, and the whole guided to the calender C, and combined and consolidated to form a single unitary sheet $c$. In some cases it will be found desirable to fold the primary sheets $b'$ about an axis in the direction of initial rolling, and to so position the sheets that the folded edge overlaps the next preceding sheet as shown in Figure 4, or both sets of primary sheets $a'$ and $b'$ may be folded and positioned in cross-rolling, overlapping relation as shown in Figure 5.

The thickness of the superimposed sheets prior to consolidation is preferably not more than eight to ten times the thickness of the final sheet to be formed therefrom. Also, the thickness of the sheets $a'$ formed from the reject or re-used composition, should preferably not be substantially more than one-half the total thickness. These features may, however, be varied as desired, and will depend upon the relative thickness or gauge of the primary and final sheets, the manner of folding, if any, and the amount of overlap, if any, etc. Where the primary sheets are arranged in cross-rolling relation, the widening by cross-rolling of the sheets, with the combining and consolidating rolls C, will preferably be approximately the same as the elongation by the primary sheeters "A" and "B," the widening being capable of variation by proper selection of the size of the pass between the rolls C as compared with the number of sheets and the total thickness of the sheets in the overlapped piles supplied to the pair of rolls.

In the convenitional calendering apparatus, there is maintained between the two rolls constituting a pair, a temperature differential, one roll being relatively cold to the other. It is to be noted that according to my invention, the primary sheets $b$ (or $b'$) formed of fresh or vigin composition, are so positioned as to be adjacent the cold roll during the combining and consolidating operation. Being adjacent the cold roll, there is relatively little slippage between the sheet and the roll and, therefore, substantially no smearing of the sheet. This feature, while not essential, is of considerable importance, since the stratum of fresh or virgin composition constitutes the wearing portion of the ultimate sheet, and it is usually undesirable that the decoration of the wearing surface have the appearance of being smeared.

The continuous unitary sheet c, formed by the consolidating and combining operation, may be used directly in the automatic inlaying machines of the Walton type or of other types requiring a continuous sheet for operation. When so used, it is cut into blocks or tesserae by means of a cutting cylinder and presser roll, certain blocks being rejected and certain blocks being utilized. The tesserae which are utilized are positioned on the inlaying drum with blocks or tesserae from similar sheets and a complete color pattern thus formed. The rejects from the sheet are returned direct to the primary sheeter "A" as described above, and the successive steps repeated in a continuous cycle.

It will be observed that according to my invention, I produce a continuous unitary sheet of linoleum composition having a lower stratum of re-used or reject composition and an upper stratum or wearing portion of fresh or virgin composition. By employing for the upper stratum, fresh or virgin composition, the color and consistency of which may be accurately controlled, I provide a wearing portion for the completed product which is of uniform character and decoration. On the other hand, by forming the lower stratum directly from the rejects, without homogenizing the variegated decoration thereof (and by the addition of small amounts of fresh or virgin composition, if desired) the variegated decoration of the lower stratum is so slightly different from the variegated decoration of the upper stratum formed from fresh or virgin composition, as to render the laminated structure of the variegated sheet indistinguishable.

Among the many advantages which my invention affords may be mentioned: (1) eliminating the accumulation of scrap composition from rejects; (2) making production independent of the necessity of finding use for scrap material in mono-colored composition; (3) saving in expensive pigments needed to convert rejects into mono-colored composition; (4) preventing the aging of scrap composition caused by the necessity of storing the same; (5) using all fresh composition for the formation of the decoration in the wearing portion of the product; (6) reducing handling costs by re-using reject composition direct; and (7) reducing the load on the mixing system by returning the rejects direct to the sheeting rolls thus resulting in a power saving and increased production capacity.

While it is apparent that my invention is particularly applicable to the production of variegated sheets and that all of the above-enumerated advantages are to be obtained when producing and employing variegated sheets of composition, it is also to be observed that my invention is not so limited and that many of the advantages set forth are to be obtained when producing sheets of plain-colored composition. Numerous modifications based on my invention as above-described will, no doubt, suggest themselves to those skilled in the art, and I do not wish to limit the scope of the invention except as defined in the appended claims.

Claims:—

1. In the manufacture of inlaid linoleum, the steps of forming a continuous variegated primary sheet of linoleum composition direct from tesserae cut and rejected from a previously-formed variegated sheet, and without homogenizing the variegated decoration of such tesserae; forming a second continuous variegated primary sheet of fresh or virgin composition; severing the continuous primary sheets into a plurality of individual primary sheets; folding each individual sheet; positioning a series of individual folded sheets formed of rejects, in cross-rolling, overlapping relation; positioning a second series of individual folded sheets formed of fresh composition, in cross-rolling overlapping relation and superimposed on said first series, the folded edge of each sheet of each series being adjacent the next preceding sheet of the respective series; combining and consolidating the series of superimposed sheets to form a unitary laminated sheet having a continuous stratum of re-used linoleum composition, and a continuous stratum of fresh or virgin linoleum composition; cutting tesserae from said laminated sheet; utilizing certain of said tesserae; rejecting certain others of said tesserae; and employing in a continuous direct cycle the rejected tesserae for the formation of additional portions of the primary sheet first-mentioned.

2. In the manufacture of inlaid linoleum, the steps of forming a continuous variegated primary sheet of linoleum composition direct from tesserae cut and rejected from a previously-formed variegated sheet, and without homogenizing the variegated decoration of such tesserae; forming a second continuous variegated primary sheet of fresh or virgin linoleum composition; severing the continuous primary sheets into a plurality of individual primary sheets; positioning a series of individual primary sheets, formed of rejects, in cross-rolling overlapping relation; folding each individual primary sheet formed of fresh or virgin composition; positioning a series of said folded primary sheets in cross-rolling overlapping relation and superimposed upon the first-mentioned series, the folded edge of each sheet of the second series being adjacent the next preceding sheet; combining and consolidating the superimposed series of primary sheets to form a unitary laminated sheet having a continuous stratum of re-used linoleum composition, and a continuous stratum of fresh or virgin composition; cutting tesseræ from said laminated sheet; utilizing certain of said tesseræ; rejecting certain others of said tesseræ; and employing in a continuous direct cycle the rejected tesseræ for the formation of additional portions of the primary sheet first-mentioned.

3. In the manufacture of inlaid linoleum, the steps of forming a series of variegated primary sheets of linoleum composition comprising tesseræ cut and rejected from a previously-formed variegated sheet; forming a second series of variegated primary sheets of virgin linoleum composition; combining and consolidating the respective series of primary sheets in superimposed relation to form a unitary laminated sheet having a continuous stratum of re-used linoleum composition, and a continuous stratum of fresh or virgin linoleum composition; cutting tesseræ from said laminated sheet; utilizing certain of said tesseræ; rejecting certain others of said tesseræ; and employing in a continuous direct cycle the rejected tesseræ for the formation of additional primary sheets of the series first-mentioned.

4. In the manufacture of inlaid linoleum, the steps of forming a variegated primary sheet of linoleum composition direct from tesseræ cut and rejected from a previously-formed variegated sheet, and without homogenizing the variegated decoration of such tesseræ; forming a second variegated primary sheet of fresh or virgin linoleum composition; combining and consolidating the said primary sheets in superimposed relation to form a unitary laminated sheet having a continuous stratum of re-used linoleum composition, and a continuous stratum of fresh or virgin linoleum composition; cutting tesseræ from said laminated sheet; utilizing certain of said tesseræ; rejecting certain others of said tesseræ; and employing in a continuous direct cycle the rejected tesseræ for the formation of additional portions of the primary sheet first-mentioned.

5. In the manufacture of inlaid linoleum, the steps of forming a primary sheet of linoleum composition comprising mainly tesseræ cut and rejected from a previously-formed variegated sheet; forming a second primary sheet comprising substantially entirely fresh linoleum composition; combining and consolidating the said primary sheets in superimposed relation to form a unitary laminated sheet having a continuous stratum of re-used linoleum composition, and a continuous stratum of fresh linoleum composition; cutting tesseræ from said laminated sheet; utilizing certain of said tesseræ; rejecting certain others of said tesseræ; and employing in a continuous direct cycle the rejected tesseræ for the formation of additional portions of the primary sheet first-mentioned.

6. In the manufacture of inlaid linoleum, the steps of forming a primary sheet of linoleum composition comprising tesseræ cut and rejected from a previously-formed variegated sheet; forming a series of variegated primary sheets of virgin linoleum composition; positioning the series of variegated primary sheets of virgin linoleum composition in cross-rolling relation and superimposed upon said primary sheet formed of reject composition; combining and consolidating the respective primary sheets to form a unitary laminated sheet having a continuous stratum of re-used linoleum composition, and a continuous stratum of fresh or virgin linoleum composition; cutting tesseræ from said laminated sheet; utilizing certain of said tesseræ; rejecting certain others of said tesseræ; and employing in a continuous direct cycle the rejected tesseræ for the formation of additional portions of the primary sheet first-mentioned.

7. In the manufacture of inlaid linoleum the steps of forming a series of variegated primary sheets of linoleum composition comprising chiefly tesseræ cut and rejected from a previously formed variegated sheet; forming a second series of variegated primary sheets of virgin linoleum composition; positioning the respective series to provide a continuous sequence of primary sheets formed of virgin linoleum composition in superimposed relation to a series of primary sheets of reject linoleum composition; combining and consolidating the assembled primary sheets to form a unitary sheet having a substantially continuous stratum of virgin linoleum composition cutting tesseræ from said unitary sheet; utilizing certain of said tesseræ; rejecting certain others of said tesseræ; and employng in a continuous direct cycle the rejected tesseræ for the formation of additional primary sheets of the series first-mentioned.

8. As a new article of manufacture, a unitary variegated sheet of linoleum composition, having a laminated structure and comprising a continuous stratum formed of variegated virgin linoleum composition constituting the wearing portion of said lonoleum sheet, and a continuous stratum formed of variegated re-used linoleum composition therebeneath.

9. As a new article of manufacture, a unitary sheet of linoleum composition, having a laminated structure and comprising a continuous stratum of virgin linoleum composition constituting the wearing portion of said linoleum sheet, and a continuous stratum of re-used linoleum composition therebeneath.

10. In the manufacture of inlaid linoleum, the steps of providing a continuous stream of linoleum composition comprising mainly tesseræ cut and rejected from a previously formed variegated sheet, providing a second and independent continuous stream of linoleum composition comprising substantially entirely virgin linoleum composition, consolidating and uniting said continuous streams in superimposed relation to form a unitary laminated sheet and having a continuous stratum composed substantially entirely of re-used linoleum composition and a continuous stratum composed substantially entirely of virgin linoleum composition, cutting tesseræ from said laminated sheet, utilizing certain of said tesseræ, rejecting certain others of said tesseræ, and employing in a continuous cycle the rejected tesseræ in providing additional portions of the continuous stream of linoleum composition first mentioned.

In testimony whereof, I affix my signature.

WALTER VEIT.